US 6,725,117 B2

(12) United States Patent
Beaucour

(10) Patent No.: US 6,725,117 B2
(45) Date of Patent: Apr. 20, 2004

(54) INSTALLATION FOR TREATING SUBSTANCES, AND A CORRESPONDING WORKSTATION AND SUPPORT FOR SUBSTANCE RECEPTACLES

(75) Inventor: Jérôme Beaucour, Nantes (FR)

(73) Assignee: Jouan, Saint-Herblain (FR)

( * ) Notice: Subject to any disclaimer, the term of this patent is extended or adjusted under 35 U.S.C. 154(b) by 315 days.

(21) Appl. No.: 09/993,707

(22) Filed: Nov. 27, 2001

(65) Prior Publication Data

US 2002/0065576 A1 May 30, 2002

(30) Foreign Application Priority Data

Nov. 27, 2000 (FR) .............................. 00 15290

(51) Int. Cl.⁷ .............................................. G06F 19/00
(52) U.S. Cl. ...................... 700/115; 700/116; 700/225; 700/228; 700/229; 422/63
(58) Field of Search ................. 700/115–116, 225–229; 340/10.42, 686.4; 435/4; 422/63–67, 104; 705/22, 28

(56) References Cited

U.S. PATENT DOCUMENTS

| 5,892,458 | A | | 4/1999 | Anderer et al. | |
|---|---|---|---|---|---|
| 5,963,134 | A | * | 10/1999 | Bowers et al. | 340/572.1 |
| 5,981,166 | A | * | 11/1999 | Mandecki | 435/4 |
| 6,053,031 | A | * | 4/2000 | Kullik et al. | 73/31.05 |
| 6,060,022 | A | * | 5/2000 | Pang et al. | 422/65 |
| 6,086,824 | A | * | 7/2000 | Fanning et al. | 422/65 |
| 6,141,602 | A | | 10/2000 | Igarashi et al. | |
| 6,148,291 | A | * | 11/2000 | Radican | 705/28 |
| 6,290,907 | B1 | * | 9/2001 | Takahashi et al. | 422/65 |
| 6,512,459 | B2 | * | 1/2003 | Benezech et al. | 340/686.4 |
| 2002/0090320 | A1 | * | 7/2002 | Burow et al. | 422/64 |

FOREIGN PATENT DOCUMENTS

EP   0 854 432 A3   7/1998

* cited by examiner

*Primary Examiner*—Leo Picard
*Assistant Examiner*—Alexander Kosowski
(74) *Attorney, Agent, or Firm*—Young & Thompson

(57) ABSTRACT

This installation comprises:

for each receptacle of substance to be treated, radio-wave transmitter means for supplying information identifying the substance contained in the receptacle;

for each workstation for implementing a treatment operation on the substances, radio-wave receiver means for supply information identifying the workstation; and for each receptacle support, both radio-wave receiver means for receiving information transmitted by the transmitter means of the receptacles and of the workstations, and at least one forwarding device for forwarding information received by the receiver means to a data storage unit. The installation is applicable to processing biological samples or materials.

25 Claims, 4 Drawing Sheets

INSTALLATION FOR TREATING SUBSTANCES, AND A CORRESPONDING WORKSTATION AND SUPPORT FOR SUBSTANCE RECEPTACLES

FIELD OF THE INVENTION

The present invention relates to an installation for treating substances of the type comprising:

receptacles for the substances to be treated;

a plurality of workstations for implementing treatment operations on the substances;

at least one support for at least one receptacle, which support is movable relative to the workstations; and a system for tracing the operations to which the substances are subjected, the system comprising a unit for storing data and communications means for communicating information between the receptacles, the workstations, and the storage units to store and associate therein data relating to the substances and the workstations in which they are placed.

The invention applies in particular to treating biological samples or materials, and in particular to culturing, conserving, and/or analyzing cells or microorganisms.

BACKGROUND OF THE INVENTION

In such an application, an installation of the above-specified type serves not only to treat the substances, but also to provide traceability of the treated substances by associating them with information relating to their identities and to the workstations in which they have been placed, and thus to the treatment operations to which they have been subjected.

An installation of the above-specified type is known in which the communications means comprise bar codes provided on the receptacles and portable bar-code readers each associated with a workstation and connected via a wire connection to the storage unit. When a sample or substance contained in a receptacle is to be subjected to a treatment operation in a workstation, an operator brings the corresponding reader close to the receptacle in order to read the bar code thereon. The identification information or identifier encoded in the bar code is then transmitted to the storage unit where it is associated with an identifier for the workstation.

In that installation, reading the identifier of a substance requires a manual operation, which can be awkward given the large number of substances which an operator may need to treat in such an installation. Furthermore, that installation does not guarantee reliable traceability of the substances since there is nothing to prevent an operator forgetting to read the bar code of a receptacle.

Document WO 0033/005 also discloses a thermostatic enclosure provided with a data storage and communications unit for exchanging information with a radio frequency (RF) identification transponder carried by a receptacle, whenever a receptacle is inserted into the enclosure. The data storage and communications unit comprises a computer, data storage means, a radio-wave transceiver, an antenna, and self-contained electrical power supply means for the transceiver. Modifying an existing enclosure to enable it to incorporate such a unit turns out to be particularly expensive.

OBJECTS AND SUMMARY OF THE INVENTION

An object of the invention is to solve these problems by providing an installation of the above-specified type that makes it possible to provide traceability for the substances treated therein in a manner that is reliable and economic.

To this end, the invention provides an installation of the above-specified type, wherein the communications means comprise:

for each receptacle, radio-wave transmitter means to supply information identifying the substance contained in the receptacle;

for each workstation, radio-wave transmitter means to supply information identifying the workstation; and for each support, both radio-wave receiver means to receive information transmitted by the transmitter means of the receptacles carried by the support and of the workstations in which or near which the support is located, and also at least one forwarding device for forwarding information received by the receiver means to the data storage unit.

In particular embodiments, the installation can comprise one or more of the following characteristics taken in isolation or in any technically feasible combination:

the forwarding device of the support is a device for forwarding information identifying the support to the information storage unit;

the receiver means of the support is adapted automatically to cause the transmitter means of the receptacles carried by the support and of the workstations in or near which the support is placed to transmit information;

the receiver means of the support is adapted regularly in time to cause the transmitter means of the receptacles carried by the support and by the workstations in or near which the support is placed to transmit information;

for each support the forwarding device comprises means for transmitting radio waves;

the frequency of the waves transmitted by the transmitter means of the forwarding device is different from the frequency of the waves transmitted by the transmitter means of the workstations and of the receptacles;

for each support, the forwarding device comprises a connector, and at least one workstation includes a complementary connector connected via a wire connection to outside the workstation to forward information received by the receiver means of the support in question to the data storage unit;

said or each wire connection connects the complementary connector to the data storage unit;

at least one workstation includes at least one acquisition means for acquiring a parameter relating to the implementation of the corresponding treatment operations, and also a forwarding device for forwarding this parameter to the data storage unit for association with the information relating to the substances treated in the workstation;

the device for forwarding the parameter to the data storage unit comprises a wire connection connecting the or each acquisition means to the data storage unit;

the device for forwarding the parameter to the data storage unit comprises the workstation radio-wave transmitter means, the acquisition means being electrically connected to said transmitter means to supply the parameter to the data storage unit via the radio-wave receiver means and the information-forwarding device of a support located close to or within the workstation;

the radio-wave transmitter means of the receptacles and of the workstations have transmitter powers of less than 10 milliwatts (mW);

the transmitter means of the workstations and of the receptacles are passive, and the radio-wave receiver means of the support also constitute means for transmitting waves for powering the transmitter means of the workstations and of the receptacles.

The invention also provides a workstation for an installation as defined above.

In particular embodiments:

its radio-wave transmitter means have a transmission power of less than 10 mW;

the radio-wave transmitter means is passive; and it includes a connector for connection to a complementary connector of a forwarding device of a moving support for receptacles, said connector being connected to the outside of the workstation by a wire connection for forwarding information received by the receiver means of the support to a data storage unit.

The invention also provides a moving support for receptacles of substances to be treated, the support being for use in an installation as defined above.

In particular embodiments:

the forwarding device of the support is a device for forwarding information identifying the support to the information storage unit of the installation;

the receiver means of the support is adapted automatically to cause the transmitter means of the receptacles carried by the support and of the workstations in which or near which the support is placed to transmit information;

the receiver means of the support is adapted at regular time intervals to cause the transmitter means of the receptacles carried by the support and of the workstations in which or near which the support is placed to transmit information;

the information-forwarding device comprises radio-wave transmitter means distinct from the radio-wave receiver means;

the radio-wave transmitter means and the radio-wave receiver means are tuned to different frequencies;

its information-forwarding device comprises a connector for connection to a complementary connector of a workstation, said complementary connector being connected to the outside of the workstation by a wire connection for forwarding the information received by the receiver means of the support to the data storage unit; and the radio-wave receiver means also constitute radio-wave transmitter means for powering the transmitter means of the workstation.

BRIEF DESCRIPTION OF THE DRAWINGS

The invention will be better understood on reading the following description given purely by way of example and made with reference to the accompanying drawings, in which.

MORE DETAILED DESCRIPTION

Figure 1:
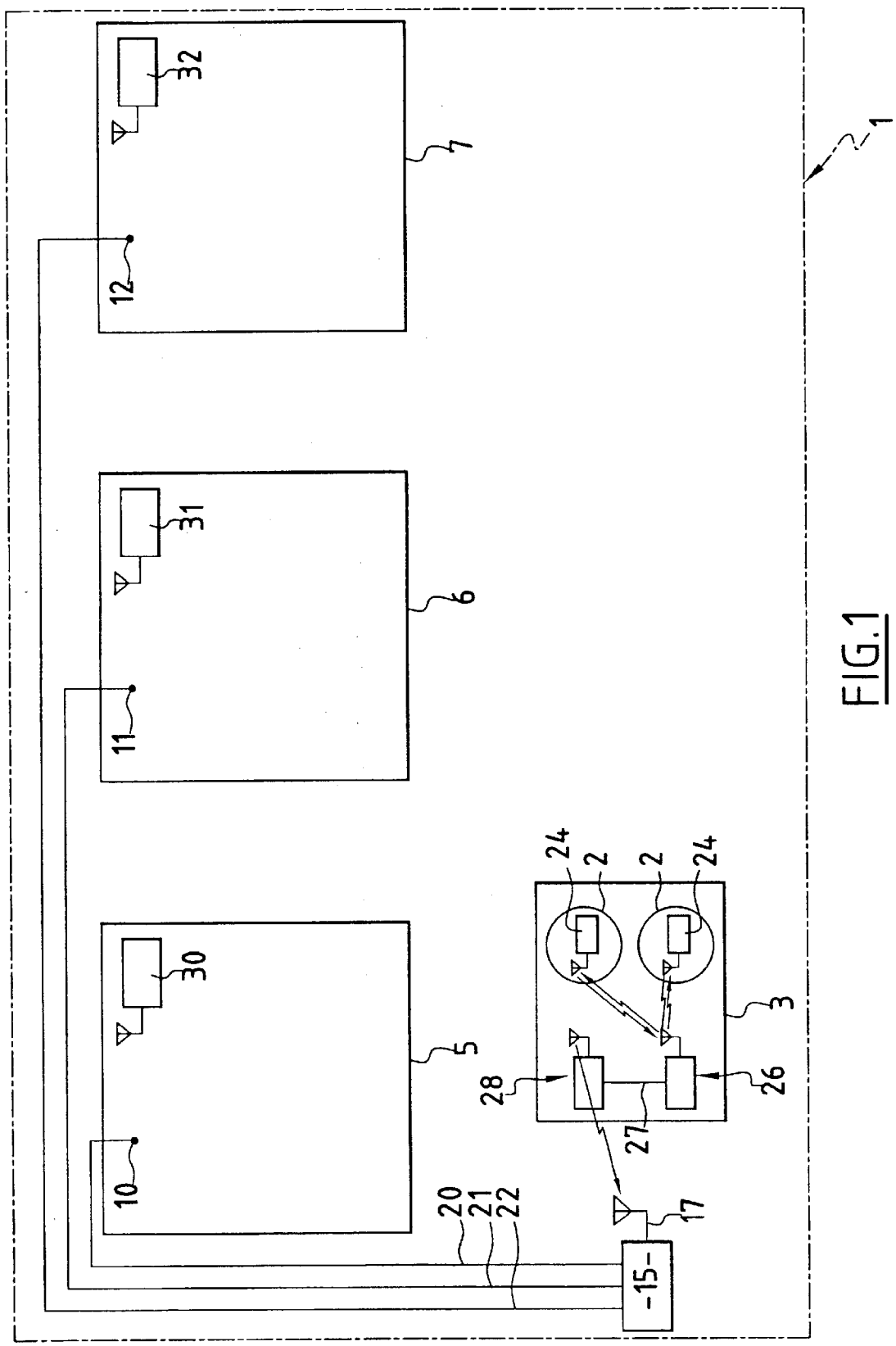
FIG. 1 is a diagrammatic plan view of an installation of the invention.

FIG. 1 shows an installation 1 for treating substances, for example samples taken from humans. More precisely, the installation 1 is intended, for example, to subject the samples to operations of growing bacteria, of performing bacteriological assays of said samples, and of storing them.

The installation 1 comprises receptacles 2, e.g. Petri dishes, a tray 3 for supporting the receptacles 2, and three workstations 5 to 7.

Each receptacle 2 contains a culture medium seeded with a sample. Seeding is performed beforehand under a laminar flow hood.

The workstation 5 is, for example, in incubator for creating a controlled atmosphere suitable for developing bacteria that are to be injected into the culture media.

The workstation 6 is, for example, an analysis device for determining the nature of the bacteria present in the culture media in the receptacles 2.

The workstation 7 is, for example, a refrigerator enabling the contents of the receptacle 2 to be stored, for example in order to perform some other analysis.

Each workstation 5 to 7 is provided with respective means 10, 11, and 12 for acquiring parameters relating to the operation implemented in the workstation in question.

Thus, the means 10 and 12 comprise, for example, temperature, pressure, and humidity sensors responsive to the atmosphere in those zones of the workstations 5 and 7 that are to receive the receptacles 2. By way of example, the means 11 are means for acquiring the results of the analysis performed in the analysis device 7.

The installation 1 also comprises a communications and data storage unit 15 which comprises a conventional computer, data storage means in the form of any suitable memory, and means for transmitting and receiving radio waves at a frequency of 433 megahertz (MHz) via an antenna 17. It is recalled that radio waves are electromagnetic waves. Frequencies other than that given above could also be envisaged, for example 125 kilohertz (kHz), 224 MHz, 446 MHz, 869 MHz, 900 MHz, 2.45 gigahertz (GHz) and 5.4 GHz.

The unit 15 is connected to the acquisition means 10, 11, and 12 via wire connections respectively referenced 20, 21, and 22.

Each receptacle 2 is provided with an identification RF transponder 24. In conventional manner, a transponder 24 comprises a printed circuit possessing an antenna and having an integrated circuit placed thereon, which integrated circuit comprises both a memory storing an identifier for the sample contained in the receptacle 2, and a module for transmitting and receiving radio waves.

The transponder is passive, i.e. it does not have its own self-contained electrical power supply means such as an optionally rechargeable battery. Such a transponder is powered electrically by the radio waves received by the antenna. The received radio waves are modified as a function of the stored identifier and they are rebroadcast by the transponder 24. Such a transponder thus constitutes transmitter means stimulated by radio waves. The stimulated transmitter power of the transponder 24 is less than 10 mW, and preferably less than 5 mW.

Such a transponder can be implemented in the form of an adhesive flexible patch, and it is low in cost. In other variants, the transponder 24 can be an active transponder optionally operating in read/write mode.

The tray 3 has a first transceiver device 26 for transmitting and receiving radio waves tuned to the transponders 24 which transmit and receive radio waves at a frequency of 13.56 MHz. In this case also, other frequencies could be envisaged. The first transceiver device 24 also includes, in particular, self-contained electrical power supply means on board the tray 3, a clock, and a memory for storing an identifier of the tray 3.

The first transceiver device 26 is connected by a wire connection 27 to a second transceiver device 28 for transmitting and receiving radio waves and also carried by the tray 3. The second transceiver device 28 is tuned to the radio-wave transceiver module of the unit 15.

In practice, the transceiver devices 26 and 28 are enclosed in a common housing.

Each workstation 5 to 7 is provided with an identification RF transponder given a respective reference 30, 31, or 32, e.g. of the same kind as the transponders 24.

When receptacles 2 are put on the tray 3, the device 26, which is adapted to proceed automatically and regularly over time with interrogations in its detection field, interrogates the transponders 24 which are then located in its detection field. These transponders 24 are powered electrically by the signals transmitted by the device 26, and they reply thereto by transmitting the identifiers of the samples contained in the receptacles 2.

It should be observed that only two receptacles 2 are shown on the tray 3. Nevertheless, such a tray 3 is capable of carrying a multitude of such receptacles, thus enabling an operator to move all of the receptacles simultaneously.

The information received by the device 26 is forwarded, optionally together with the identifier of the tray 3, over the connection 27 to the device 28 which then forwards them by means of radio waves to the unit 15, passing via the antenna 17.

The unit 15 then associates the identifiers of the samples contained in the receptacles 2 with the identifier of the tray 3 in correspondence with time information as supplied by the clock of the unit 15. The unit 15 stores such information and makes time associations therewith at regular intervals until the tray 3 is inserted in a workstation.

Figure 2:
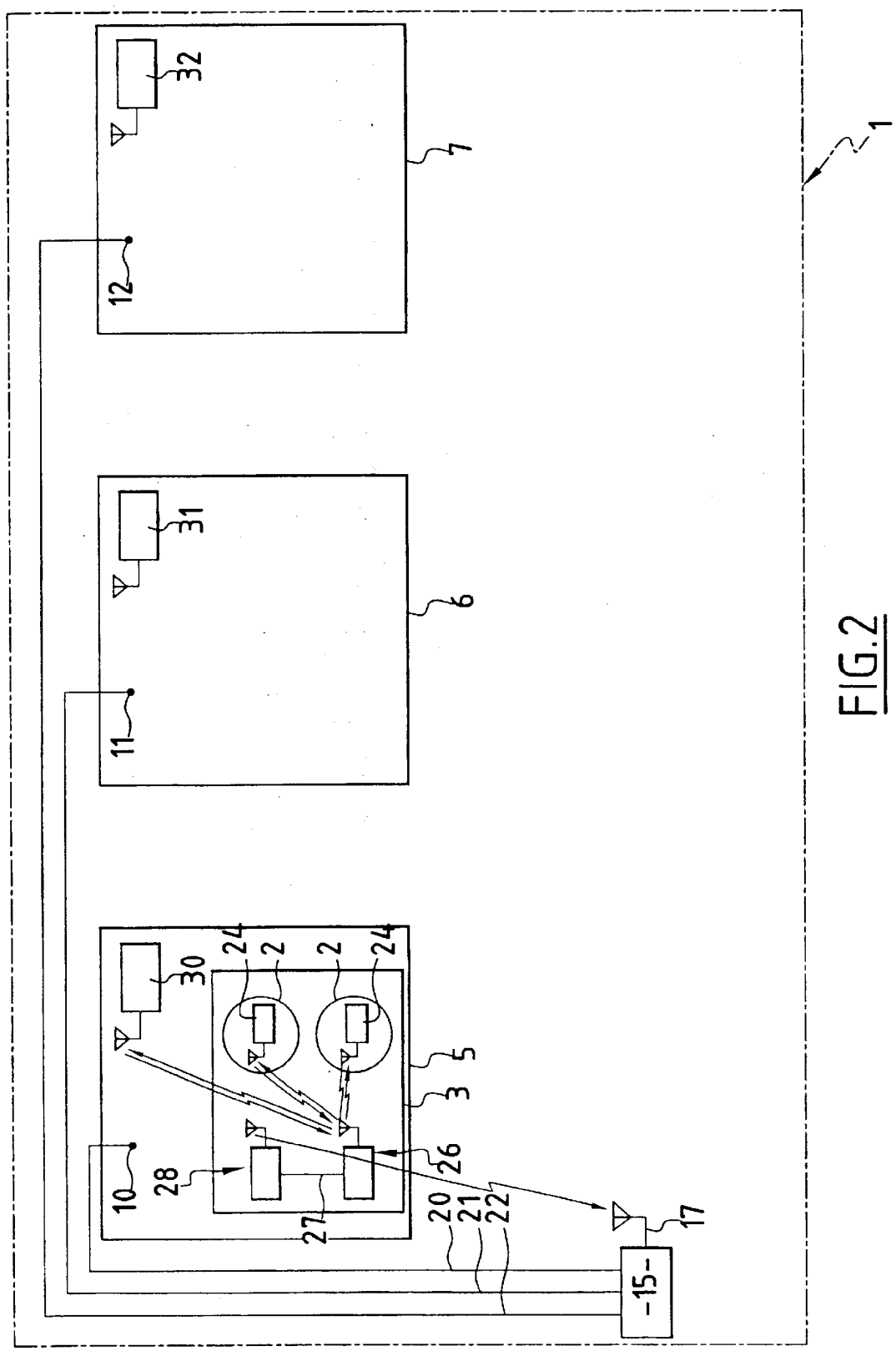
FIGS. 2 and 3 are views analogous to FIG. 1 showing two successive steps in the treatment of substances in the FIG. 1 installation.

As shown in FIG. 2, once the tray 3 has been inserted in the incubator 5, in response to its interrogations the device 26 receives not only the identifiers stored in the transponders 24 of the receptacle 2, but also the identifier of the incubator 5 as stored in the transponder 30. These identifiers together with the identifier of the tray 3 as stored in the device 26 are then forwarded via the device 28 and the antenna 17 to the unit 15 where they are stored and associated with time information as supplied by the clock of the unit 15 and with parameters provided by the acquisition means 10 concerning the treatment operation implemented in the incubator 5. The unit 15 stores and associates such information at regular intervals until the tray 3 is withdrawn from the incubator 5.

Figure 3:
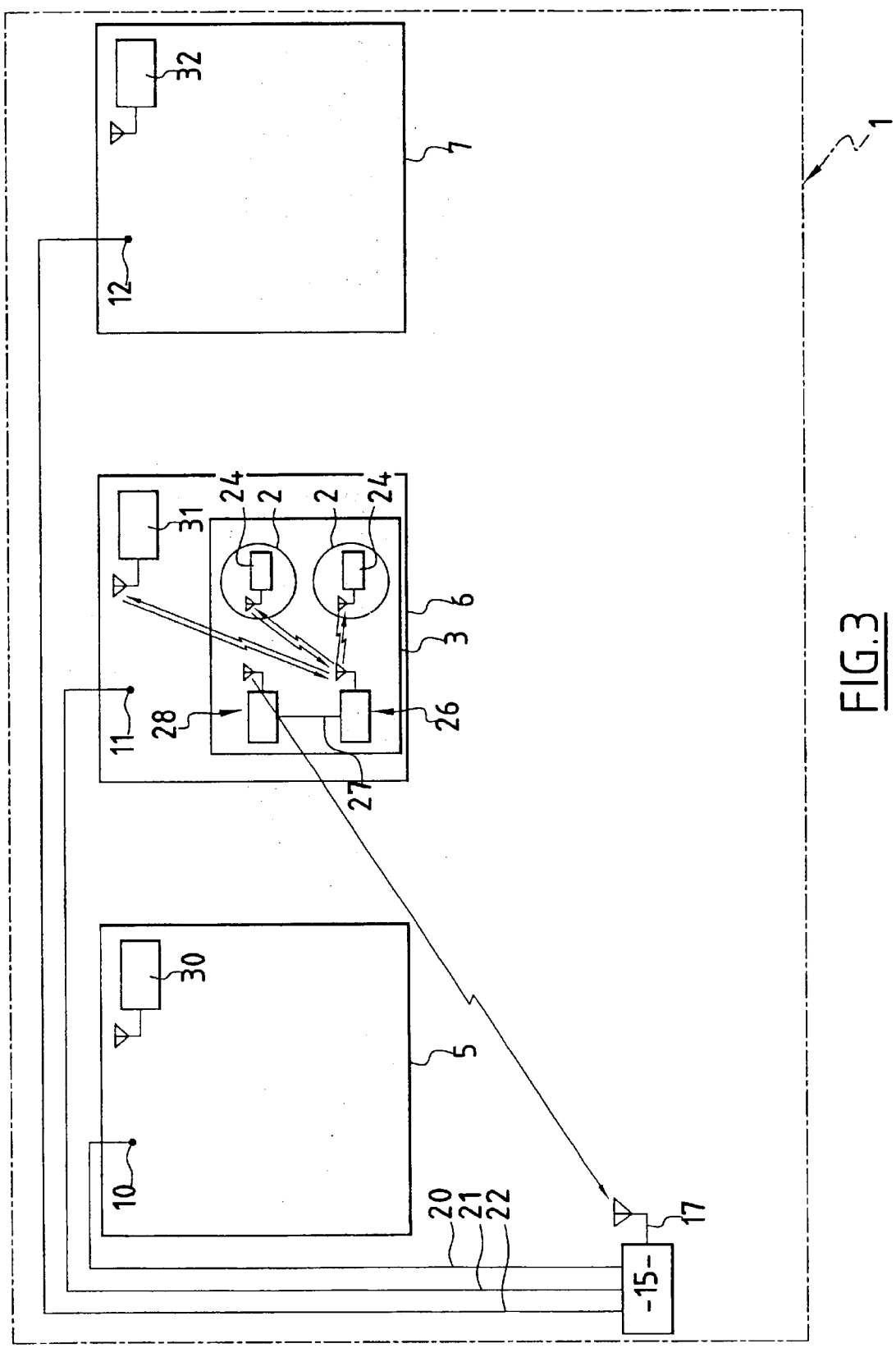

As shown in FIG. 3, when the tray is withdrawn from the incubator 5 and then inserted into the analysis device 6, the transceiver device 26 receives in response to its interrogations the identifier of the analysis device 6 as transmitted by the transponder 31 together with the identifiers stored in the transponders 24. These various identifiers are again forwarded together with the identifier of the tray by the transmitter device 28 via the antenna 17 to the unit 15 where the data is associated with the results of the analysis as provided by the acquisition means 11, and also with time information.

Finally, when the tray 3 is withdrawn from the analysis device 6 and put into the refrigerator 7, the transceiver device 26 again receives, in response to an interrogation, the identifier, this time of the refrigerator 7 as stored in its transponder 32, together with the identifiers stored in the transponders 24 of the receptacles 2. These identifiers together with the identifier of the tray 3 as stored in the device 26 are then sent to the unit 15 via the device 28 and the antenna 17. The data is again associated with time information as supplied by the clock of the unit 15 and with the information supplied by the acquisition means 12 concerning storage conditions in the refrigerator 7.

It will be understood that the installation 1 described above makes it possible to trace the samples that are treated therein. The unit 15 stores and associates data specifying on a regular basis whether a sample is to be found on the tray 3, whether it is to be found in a workstation, and if so in which workstation, and under such circumstances, the conditions to which the sample is subjected in the workstation or the results of the operation implemented by the workstation.

Furthermore, the acquisition of the various data items and the forwarding thereof to the unit 15 take place automatically without any need for an operator to make use of a portable reader. The installation thus simplifies the task of the operator and limits any risk of an identifier not being read.

In particular, it is possible to discover how much time a receptacle 2 has remained outside a workstation and thus at ambient temperature, and for example to detect automatically when a receptacle 2 is put on or taken off a tray 3.

The installation described can also be implemented using workstations 5 to 7 that are already in existence, without any need for such workstations to be subjected to major or expensive modifications.

These workstations need no more than passive transponders of the kind described above, and these are of particularly low in cost. More particularly, when the transponders are adhesive patches it suffices to stick them on the walls of the workstations.

In addition, the above principles can be applied to installations regardless of whether the trays 3 and the receptacles 2 are handled manually or automatically.

It should also be observed that the device 26 of the tray 3 having its own memory, its own clock, and a self-contained electrical power supply means makes it possible to ensure that samples are traced reliably even if the connection between the device 28 and the unit 15 is disturbed for a certain length of time.

Figure 4:
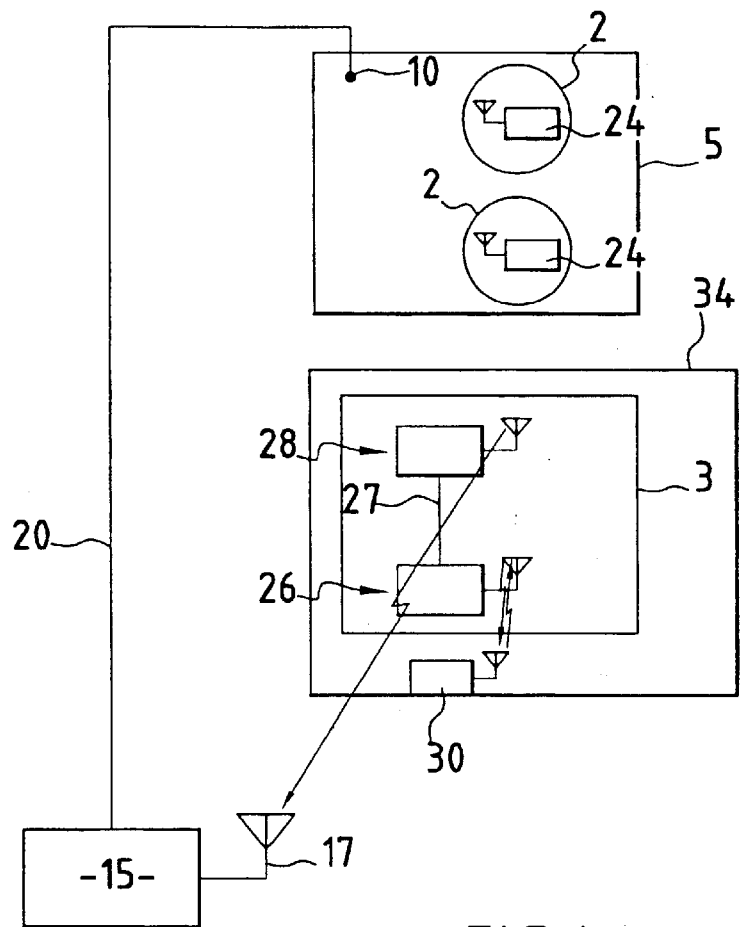
FIGS. 4 and 5 are fragmentary diagrammatic plan views showing variants of the FIG. 1 installation.

FIG. 4 shows a variant of the installation 1 in which the incubator 5 is too small in size for the tray 3 to be inserted therein.

In order to place the receptacles 2 carried by the tray 3 inside the incubator 5, the tray 3 is brought near to the incubator 5 and is put down on a table 34, for example. The transponder 30 associated with the incubator 5 is placed on the table 34 so as to be within the detection field of the device 26 of the tray 3.

The receptacles 2 are then taken off the tray 3 and placed inside the incubator 5. In response to its interrogations, the radio-wave transceiver device 26 receives only the identifier of the incubator 5, since the transponders 24 of the receptacles 2 are situated outside the detection field of the device 26. The device 28 then forwards only the identifiers of the incubator 5 and of the tray 3 to the unit 15, which deduces from the absence of the receptacles 2 on the tray 3 and from its proximity to the incubator 5 that the receptacles 2 have been inserted in the incubator 5. The unit 15 therefore associates the time information supplied by its clock with the information supplied by the acquisition means 10 and the identifier of the incubator 5 with the information relating to the samples contained in the receptacles 2.

This variant can also serve to illustrate an installation 1 in which the trays 3 and the receptacles 2 are handled automatically. Under such circumstances, trays 3 are moved automatically between the various workstations and are held in register with them by displacement means while manipulator arms take the receptacles 2 and place them in the workstations.

Figure 5:
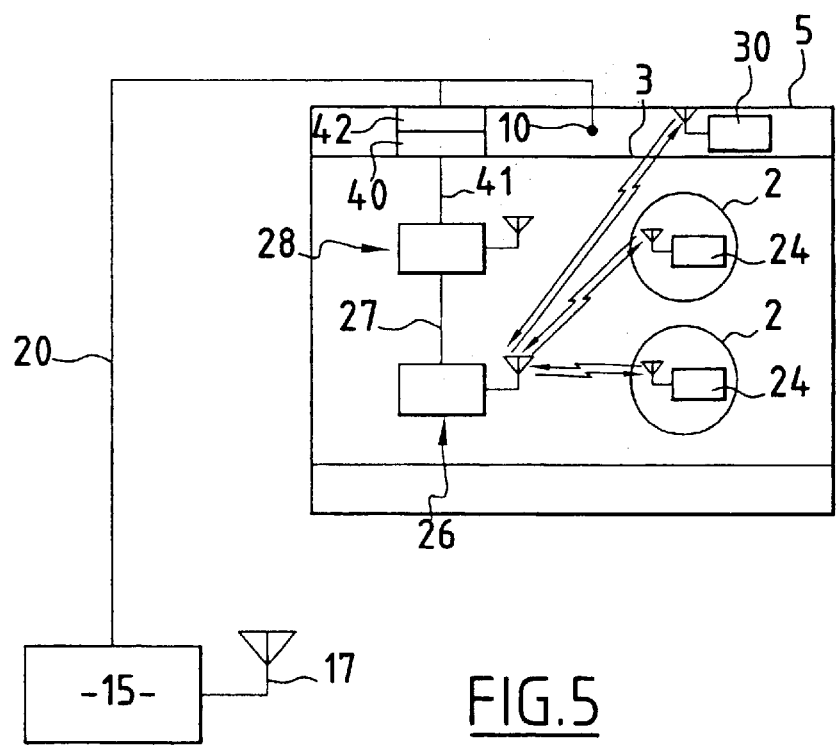

FIG. 5 shows another embodiment in which the tray 3 constitutes a removable shelf of the incubator 5. The tray 3 can then be mounted releasably inside the incubator 5 by conventional means (not shown).

The tray 3 has a connector 40 electrically connected by a wire connection 41 to the transceiver device 26, e.g. via the transmitter device 28. The incubator 5 is provided on its side wall facing the connector 40 with a complementary connector 42 electrically connected by a wire connection 20 to the unit 15.

When the tray 3 is mounted inside the incubator 5, the connectors 40 and 42 are releasably interconnected so as to provide an electrical connection. The identifiers of the incubator 5, of the samples contained in the receptacles 2, and of the tray 3 are then forwarded to the unit 15 via the connectors 40, 42 and the wire connection 20. This variant is particularly useful when the walls of the incubator 5 are not transparent to the radio waves used for communications purposes by the unit 15 and the device 28 of the tray 3.

In another variant (not shown), the connector 42 is connected via a wire connection to an antenna placed outside the incubator 5 for the purpose of forwarding the identifiers of the tray 3, the incubator 5, and the samples to the unit 15 via its own antenna 17.

In yet another variant (not shown) of the installation of FIGS. 1 to 3, the wire connection between one or each workstation and the unit 15 can be omitted. Under such circumstances, the corresponding acquisition means is electrically connected to the respective transponder 30, 31, or 32 of the workstation which then serves to forward the parameters relating to the treatment operation together with the identifier of the workstation to the device 26 and thus to the unit 15 via the device 28.

In general, the invention can be applied to any installation for treating biological substances or matter, and the workstations can be constituted, for example, by incubators, ovens, refrigerators, bench tops under laminar flow hoods, centrifuges, or any other workstation provided with means for implementing a treatment operation. The term "treatment" should be understood broadly as covering any operation or sequence of operations subjecting a substance to determined conditions or interventions, and can also consist merely in an operation of storage under determined conditions.

In still more general manner, the invention can be applied to treating all types of substances, e.g. in fields other than biology. For example, it can thus be applied to manufacturing electronic components.

What is claimed is:

1. An installation for treating substances, the installation being of the type comprising:
   receptacles for the substances to be treated;
   a plurality of workstations for implementing treatment operations on the substances;
   at least one support for at least one receptacle, which support is movable relative to the workstations; and
   a system for tracing the operations to which the substances are subjected, the system comprising a unit for storing data and communication means for communicating information between the receptacles, the workstations, and the storage units to store and associate therein data relating to the substances and the workstations in which they are placed;
   wherein the communications means comprise:
      for each receptacle, radio-wave transmitter means to supply information identifying the substance contained in the receptacle;
      for each workstation, radio-wave transmitter means to supply information identifying the workstation; and
      for each support, both radio-wave receiver means to receive information transmitted by the transmitter means of the receptacles carried by the support and of the workstations in which or near which the support is located, and also at least one forwarding device for forwarding information received by the receiver means to the data storage unit.

2. An installation according to claim 1, wherein the forwarding device of the support is a device for forwarding information identifying the support to the information storage unit.

3. An installation according to claim 1, wherein the receiver means of the support is adapted automatically to cause the transmitter means of the receptacles carried by the support and of the workstations in or near which the support is placed to transmit information.

4. An installation according to claim 1, wherein the receiver means of the support is adapted regularly in time to cause the transmitter means of the receptacles carried by the support and by the workstations in or near which the support is placed to transmit information.

5. An installation according to claim 1, wherein for each support the forwarding device comprises means for transmitting radio waves.

6. An installation according to claim 5, wherein the frequency of the waves transmitted by the transmitter means of the forwarding device is different from the frequency of the waves transmitted by the transmitter means of the workstations and of the receptacles.

7. An installation according to claim 1, wherein, for each support, the forwarding device comprises a connector, and wherein at least one workstation includes a complementary connector connected via a wire connection to outside the workstation to forward information received by the receiver means of the support in question to the data storage unit.

8. An installation according to claim 7, wherein said or each wire connection connects the complementary connector to the data storage unit.

9. An installation according to claim 1, wherein at least one workstation includes at least one acquisition means for acquiring a parameter relating to the implementation of the corresponding treatment operations, and also a forwarding device for forwarding this parameter to the data storage unit for association with the information relating to the substances treated in the workstation.

10. An installation according to claim 9, wherein the device for forwarding the parameter to the data storage unit comprises a wire connection connecting the or each acquisition means to the data storage unit.

11. An installation according to claim 9, wherein the device for forwarding the parameter to the data storage unit comprises the workstation radio-wave transmitter means, the acquisition means being electrically connected to said transmitter means to supply the parameter to the data storage unit via the radio-wave receiver means and the information-forwarding device of a support located close to or within the workstation.

12. An installation according to claim 1, wherein the radio-wave transmitter means of the receptacles and of the workstations have transmitter powers of less than 10 mW.

13. An installation according to claim 12, wherein the radio-wave transmitter means of the workstations and of the receptacles are passive, and wherein the radio-wave receiver means of the support also constitute means for transmitting waves for powering the transmitter means of the workstations and of the receptacles.

14. A workstation for an installation according to claim 1.

15. A workstation according to claim 14, wherein its radio-wave transmitter means have a transmission power of less than 10 mW.

16. A workstation according to claim 15, wherein the radio-wave transmitter means is passive.

17. A workstation according to claim 14, including a connector for connection to a complementary connector of a forwarding device of a moving support for receptacles, said connector being connected to the outside of the workstation by a wire connection for forwarding information received by the receiver means of the support to a data storage unit.

18. A moving support for receptacles of substances to be treated, for use in an installation according to claim 1.

19. A support according to claim 18, wherein the forwarding device of the support is a device for forwarding information identifying the support to the information storage unit of the installation.

20. A support according to claim 18, wherein the receiver means of the support is adapted automatically to cause the transmitter means of the receptacles carried by the support and of the workstations in which or near which the support is placed to transmit information.

21. A support according to claim 20, wherein the receiver means of the support is adapted at regular time intervals to cause the transmitter means of the receptacles carried by the support and of the workstations in which or near which the support is placed to transmit information.

22. A support according to claim 18, wherein the information-forwarding device comprises radio-wave transmitter means distinct from the radio-wave receiver means.

23. A support according to claim 18, wherein the radio-wave transmitter means and the radio-wave receiver means are tuned to different frequencies.

24. A support according to claim 18, wherein its information-forwarding device comprises a connector for connection to a complementary connector of a workstation, said complementary connector being connected to the outside of the workstation by a wire connection for forwarding the information received by the receiver means of the support to the data storage unit.

25. A support according to claim 18, wherein the radio-wave receiver means also constitute radio-wave transmitter means for powering the transmitter means of the workstation.

* * * * *